United States Patent [19]

Wilson

[11] 4,194,399
[45] Mar. 25, 1980

[54] WHEEL BALANCING TOOL

[76] Inventor: E. Robert Wilson, 5745 S. Huron St., Littleton, Colo. 80120

[21] Appl. No.: 948,966

[22] Filed: Oct. 5, 1978

[51] Int. Cl.² ........................................... G01M 1/12
[52] U.S. Cl. ............................. 73/486; 116/DIG. 39
[58] Field of Search ............... 73/486, 487; 116/304, 116/DIG. 39

[56] References Cited

U.S. PATENT DOCUMENTS

| | | | |
|---|---|---|---|
| 2,220,590 | 11/1940 | Vogt | 116/304 |
| 2,647,398 | 8/1953 | Marvel | 73/486 |
| 2,698,537 | 1/1955 | Taylor et al. | 73/486 |
| 4,051,733 | 10/1977 | Tomkin | 73/486 X |

Primary Examiner—Jerry W. Myracle
Attorney, Agent, or Firm—H. W. Oberg, Jr.

[57] ABSTRACT

A wheel balancing tool having a support cable that partially extends into a hollow shaft to a suspension point coincident with the tube axis, two wheel adapters threaded onto the tube, and an annular magnifying indicator attached to the cable juxtaposed an indicator plate attached to the tube, the suspension point adjustable within the tube by means of a rod having an end portion extending into the tube to define the suspension point and a stop means attached to the rod for adjusting entry of the rod into the tube.

9 Claims, 4 Drawing Figures

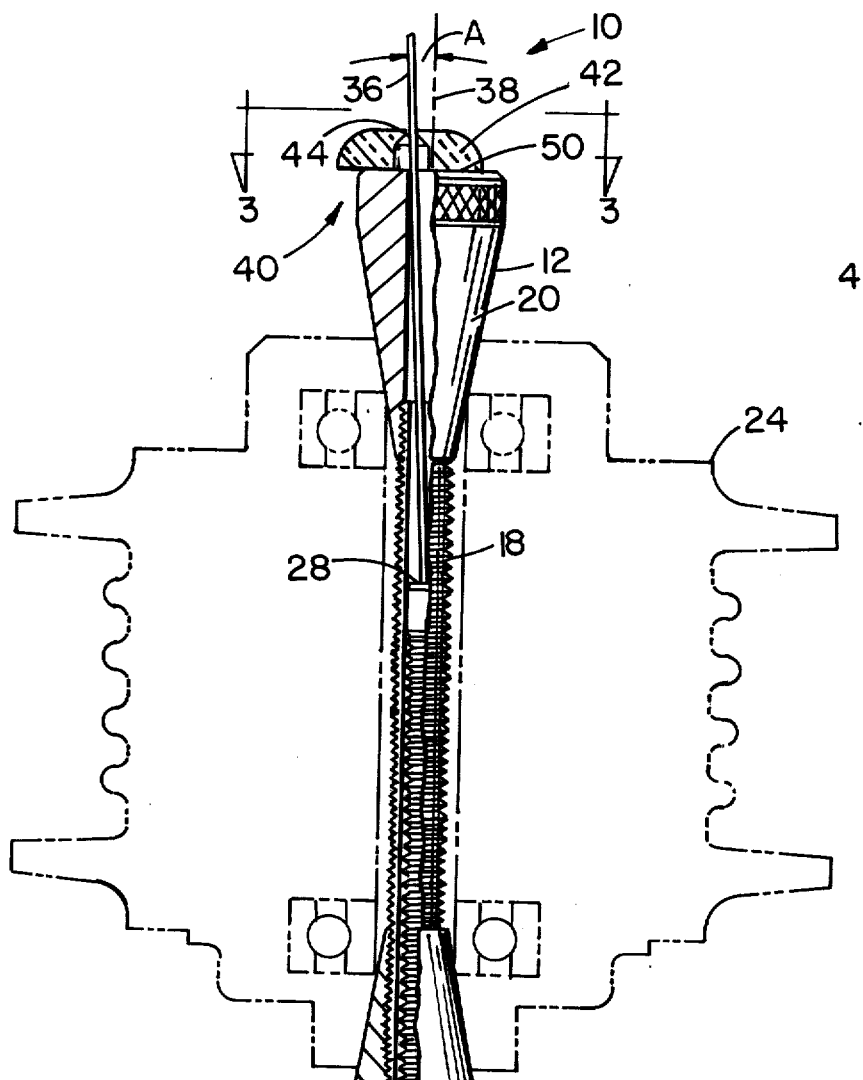
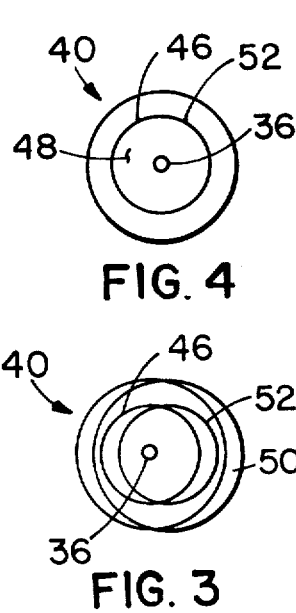
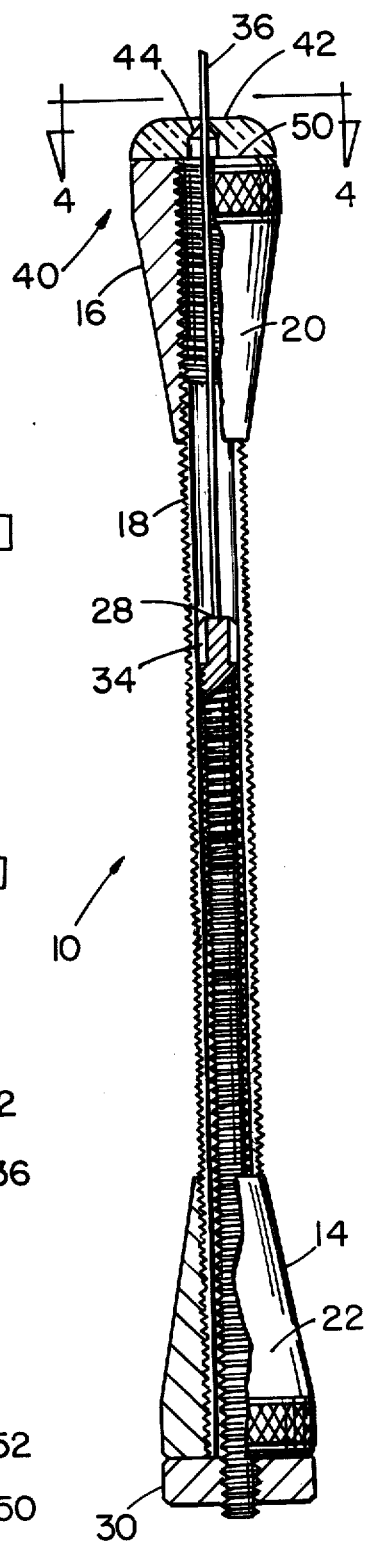

WHEEL BALANCING TOOL

BACKGROUND OF THE INVENTION

The invention relates to measuring and testing devices, but more particularly, the invention relates to a tool for measuring rotor or wheel imbalance.

Wheel balancing tools of the hanging type are used to determine the static imbalance of a wheel or rotor. Operation of the tool requires that the center of gravity of the article being balanced be placed below a flexible suspension point of the tool. When the center of gravity of the article being balanced does not coincide with the axis of the suspension cable, the offset center of gravity causes an angular tilting of the article in relation to the suspending cable. The degree of imbalanced may be indicated by means of an annular disc attached to the cable and a juxtaposed indicator plate attached to the article.

Sensitivity of such suspension balancing devices is influenced by the displaced location of the center of gravity of the article being tested below the suspension point of the tool, and by the ease and accuracy of determining measured angular deflections between the suspension cable and suspended article.

Adjustment of the center of gravity location may be made by moving threaded wheel adapters along a threaded tube. An example of such a method is shown in U.S. Pat. No. 2,698,537 (FIG. 5). The problem with such a means for adjustment is that the article being balanced must be repetitively disengaged from the adapters as the adjustment for center of gravity location is made. The balanced article may be quite heavy which could lead to a tedious operation as the article is disengaged from the tool and the adapters adjusted.

Once the center of gravity is properly located in relation to the balancing tool, it becomes important to accurately read the degree of imbalance such as with discs and indicator plates. Examples of annular discs attached to a suspension cable and a reference plate attached to the article being balanced is shown in U.S. Pat. Nos. 2,481,256 (FIG. 6) and 2,647,398 (FIG. 4). The problem with such indicators is that it is very difficult to view very small angular displacements measured by the disc and reference plate as the article being balanced approaches a true, static balance. An observer must attempt a line of sight as close to the suspending cable as possible for an accurate reading.

SUMMARY OF THE INVENTION

In accordance with the invention, a suspension type wheel-balancing tool is provided which has a hollow shaft to which are affixed adapters for engaging a wheel or rotor to be balanced. A support cable has an end portion which extends into the bore of the tube to a suspension point coincident with the tube axis. The suspension point is adjustable along the bore by means of a rod having one end portion that extends into the hollow shaft to define the suspension point. The suspension point is adjustable within the shaft bore by a stop means adjustable along the rod. An annular magnifying lens, with indicia, is attached to the cable above an indicator plate, with indicia, attached to the hollow shaft.

Accordingly, an object of the invention is to provide a means for easily adjusting the suspension point of the tool without requiring disengagement of the wheel adapters.

Another object of the invention is to provide a magnifying system as an integral part of the tool measurement system so that slight imbalance of an article may be readily determined without taking a line of sight as close to the cable as possible.

An advantage of the invention is that the suspension point of the tool may be readily adjusted so that the center of gravity of the article being balanced is quickly and properly positioned.

Still another advantage of the invention is that the magnifying indicator of the imbalance measurement system assures a quick and proper determination of the degree of balance.

These and other objects of the invention will be apparent after reviewing the drawings and description thereof wherein:

FIG. 1 is a partial cutaway side view of the invention attached to the hub of an unbalanced wheel shown in phantom;

FIG. 2 is a partial cutaway side view showing an adjusted tool suspension point and a modified form of the invention;

FIG. 3 is a view taken along the line 3—3 of FIG. 1; and

FIG. 4 is a view taken along the line 4—4 of FIG. 2.

DESCRIPTION OF PREFERRED EMBODIMENT

Referring to the drawings, a wheel balancing tool 10 of the suspension type is provided. Wheel adapters 12, 14, 16 are threaded or attached onto a hollow shaft 18. The threads provide a convenient means for adjusting at least one of the adapters 14 axially along the shaft. One of the adapters 12 may be fixed relative to the shaft or the adapter 16 may be adjustable axially along the shaft. Of course, means other than threads may be used to attach and adjust the adapters on the shaft.

The adapters may take any desired configuration to fit the configuration of the article to be balanced. Examples of such configurations are shown in the above referenced patents. As shown, the adapters have conical surface portions 20, 22 which diverge from each other. The conical surfaces provide an aligning expedient that positions the shaft 18 coincident with the rotation axis of the article being balanced.

A rod 26 has an end portion which extends into the hollow shaft 18 to define a suspension point 28. A stop means 30 is provided on the rod means to control the penetration of the rod and thus, the location of the suspension point relative to the location of the adapters. The stop means may take any desired form. For example, the rod may be in the form of a clevis with several radial holes and the stop means may be in the form of a pin. More preferably, the rod is threaded and the stop means is in the form of a nut which may be easily positioned at different locations along the rod. The nut may be knurled 32 to facilitate easy movement without the aid of any special tools. The stop means abuts the shaft (FIG. 1) or a portion of the adapter (FIG. 2) to prevent further entry of the rod. A bushing 34 may be used between the rod and shaft to help hold the rod in position as the stop means is adjusted.

A suspension member 36 extends into the opposite end of the shaft and is attached to the rod so that the suspension point 28 is coincident with the tube axis 38. The suspension member is flexible at the suspension point. Flexibility may be achieved by means of a reduced diameter of the suspension member or by means of a flexible wire or cord. More preferably, the suspension member is a wire cable which readily provides the required flexibility.

An indicator means 40 is provided for showing the relative position between the suspension member and the hollow shaft. An annular lens 42 is attached 44 through its annulus to the suspension cable. Preferably, the attachment is frictional in nature so that the lens may be rotated or displaced longitudinally along the suspension member to a desired position. The lens has indicia means inscribed thereon such as an eccentric mark spaced from the support member. More preferably, the indicia mark is in the form of an inscribed circle 46 concentric with the support member. The lens magnification is preferably at least 2 X. Additional arcuate marks 48 may be inscribed adjacent the circle to indicate incremental amounts of imbalance.

The lens is positioned juxtaposed an indicator plate 50 attached to the hollow shaft. The indicator plate may be in the form of an extension of the shaft or more preferably as an integral part of the support member 12, 16. Preferably, the indicator plate has an indicia mark in the form of a circle 52 inscribed thereon which has the same diameter as the indicia mark of the lens, and is concentric with the tube axis.

In use, the tool is attached to the article being balanced. The conical surfaces of the adapters align the axis of the shaft to be substantially coaxial with the rotational axis of the article. The tool 10 and article 24 are suspended (FIG. 1) by the suspension member. The suspension point 28 is adjusted to be above the center of gravity of the article. A static imbalance of the article causes it to tip angularly A in relation to the suspension member 36 in the direction of imbalance. The indicating circles 46, 52 of the lens 42 and indicator plate 50 intersect each other, making it easy to see the direction of imbalance. Weights may then be added to the article so that the circles coincide. Magnification of the lens permits easy viewing of the circles from a convenient observer angle.

The foregoing detailed description is made for purpose of illustration only and it is not intended to limit the scope of the invention which is to be determined from the appended claims.

What is claimed is:

1. A balancing tool comprising:
 a hollow shaft having a substantially smooth bore and an axis;
 two spaced adapter means attached coaxial to the shaft for engaging portions of an article to be balanced, and wherein at least one of the adapter means is adjustable to desired axial positions along portions of the hollow shaft;
 a rod means having a first end portion substantially coaxially disposed within the bore of the hollow shaft and having a second portion extending from the bore of the hollow shaft, said first end portion slidably axially movable in portions of the bore and defining a suspension point substantially coincident with the shaft axis;
 a stop means adjustable axially along an extending portion of the rod means for maintaining the suspension point of a desired position in the bore;
 a bushing between the shaft and first end portion to help hold the rod in position as the stop means is adjusted;
 a suspension member extending into the hollow shaft and attached to the rod means at the suspension point and substantially coincident with the hollow shaft axis; and
 indicator means for showing a relative position between the suspension member and the hollow shaft.

2. The wheel balancing tool as claimed in claim 1 wherein the suspension member is a cable.

3. The wheel balancing tool as claimed in claim 1 wherein the hollow shaft is externally threaded and at least one of the wheel adapter means has internal threads that adjustably attach it to the hollow shaft.

4. The wheel balancing tool as claimed in claim 1 wherein the wheel adapter means have coaxial conical surfaces which diverge in an opposite direction from each other.

5. The wheel balancing tool as claimed in claim 1 wherein the extending portion of the rod means has an externally threaded portion and the stop means has a mating internally threaded portion whereby the stop means is adjustable along the rod means.

6. A balancing tool comprising:
 a hollow shaft having a bore and an axis;
 two spaced adapter means attached coaxial to the shaft for engaging portions of an article to be balanced, and wherein at least one of the adapter means is adjustable to desired axial positions along portions of the hollow shaft;
 a rod means having a first end portion substantially coaxially disposed within the bore of the hollow shaft and having a second portion extending from the bore of the hollow shaft, said first end portion axially moveable in portions of the bore and defining a suspension point substantially coincident with the shaft axis;
 a stop means adjustable axially along an extending portion of the rod means for maintaining the suspension point at a desired position in the bore;
 a suspension member extending into the hollow shaft and attached to the rod means at the suspension point and substantially coincident with the hollow shaft axis; and
 indicator means for showing a relative position between the suspension member and the hollow shaft wherein the indicator means comprises an indicator plate attached to the hollow shaft with an indicia mark that is spaced from the hollow shaft axis at a radius; and an annular magnifying lens attached through its annulus to the suspension member juxtaposed the indicator plate, the lens having an indicia mark spaced from the support member at a radius substantially equal to that radius of the plate indicia mark.

7. The wheel balancing tool as claimed in claim 6 wherein the plate indicia mark and the lens indicia mark are circles of substantially equivalent diameters.

8. In a wheel balancing tool of the type having a suspension cable that partially extends into a threaded hollow shaft to a suspension point coincident with the tube axis, wheel adapters threaded onto the tube, an indicator plate having an annular indicia mark, the improvement comprising:
 an annular magnifying lens coaxially attached to the suspension cable juxtaposed the indicator plate, the magnifying lens and indicator lens having indicia marks at substantially the same radius in relation to the tube axis.

9. A balancing tool comprising:

a threaded hollow shaft;

two adapters threaded on the shaft each having conical surface portions arranged divergent from each other and coaxial with the shaft;

a threaded rod having an end portion extending into one end of the hollow shaft and defining a suspension point coincident with the hollow shaft axis;

a stop means comprising a nut threaded onto an extending portion of the rod;

a suspension cable having a portion extending into a second end of the shaft and attached to the rod at the suspension point;

an annular magnifying lens attached through its annulus to the suspension cable and having an indicia cable enscribed thereon having a center coaxial with the axis of the cable; and a referenced plate attached to the hollow shaft and positioned juxtaposed the lens and its inscribed cable, the reference plate having an inscribed circle of substantially the same diameter as that of the lens and a center that is coaxial with the shaft axis.

* * * * *